H. M. BRAMBERRY.
METALLIC PISTON PACKING.
APPLICATION FILED APR. 8, 1921.
1,396,620.
Patented Nov. 8, 1921.
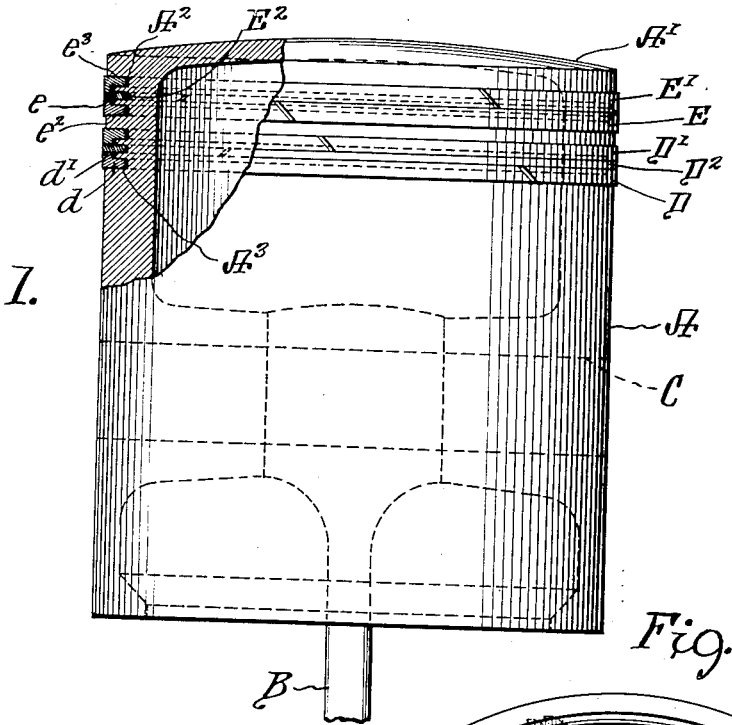
Fig. 1.
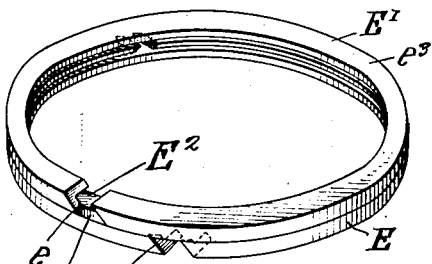
Fig. 5.
Fig. 3. Fig. 2.
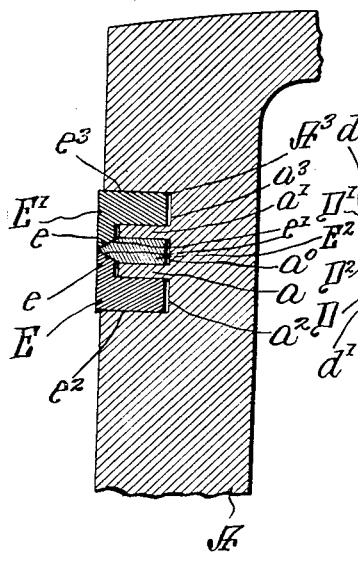
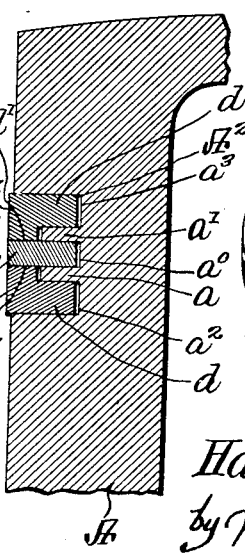
Fig. 4.
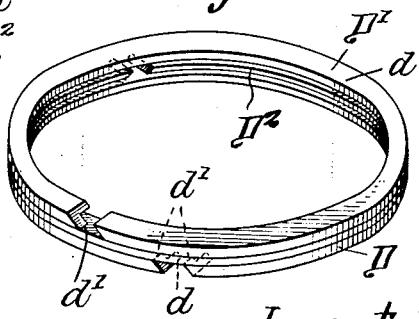
Inventor
Harry M. Bramberry
by Wilkinson & Giusta
Attorneys.

UNITED STATES PATENT OFFICE.

HARRY MORTON BRAMBERRY, OF NORFOLK, VIRGINIA, ASSIGNOR TO PISTON RESEARCH CORPORATION, OF NORFOLK, VIRGINIA, A CORPORATION OF VIRGINIA.

METALLIC PISTON-PACKING.

1,396,620. Specification of Letters Patent. Patented Nov. 8, 1921.

Application filed April 8, 1921. Serial No. 459,568.

*To all whom it may concern:*

Be it known that I, HARRY MORTON BRAMBERRY, a citizen of the United States, residing in Norfolk, in the county of Norfolk and State of Virginia, have invented certain new and useful Improvements in Metallic Piston-Packings; and I do hereby declare the following to be a full, clear, and exact description of the invention, such as will enable others skilled in the art to which it appertains to make and use the same.

My present invention relates to improvements in metallic piston packing, and is intended to provide a cheap, simple, durable and efficient arrangement which may be readily inserted and removed when desired.

In metallic packing for pistons, especially when used for internal combustion engines, it is requisite not only to provide a practically tight joint to prevent the escape of the explosive gases from the combustion end of the cylinder, but also to wipe the oil or carbon from the inner wall of the cylinder and also to prevent the creeping of the lubricant around the sides and in rear of the packing ring or rings, there being ordinarily great trouble in this creeping of the lubricant in the wrong direction in the cylinder.

The objections hereinbefore referred to are in a large measure overcome by the construction that will be hereinafter described.

My invention will be fully understood after reference to the accompanying drawings in which,—

Figure 1 is a side elevation of a piston provided with my improved packing rings, parts being broken away.

Fig. 2 shows a section on a larger scale of a portion of the piston using only one of the compound packing rings.

Fig. 3 is a similar view to Fig. 2 which shows another form of compound packing ring.

Fig. 4 is a perspective view on a smaller scale of the ring packing shown in Fig. 2.

Fig. 5 is a similar view to Fig. 4, but shows a ring packing used in Fig. 3.

A represents the piston which is provided with the usual closed end A' with the rear open end into which the connecting rod B projects, which rod is pivoted on pin C in the usual way.

The outer wall of the piston is provided in its forward end with one or more annular recesses, such as shown at $A^2$ in Figs. 1 and 2, or $A^3$ in Figs. 1 and 3. Each of these annular recesses is provided with two annular ribs $a$, $a'$, between which is an annular groove $a^0$, and exterior to these ribs $a$, $a'$, are two other annular grooves $a^2$ and $a^3$ with the result that each one of these annular recesses $A^2$ and $A^3$ is divided up into four annular channels, each having parallel side walls, and said side walls being in planes at right angles to the axis of the piston.

In Fig. 1, I have shown two of such annular recesses in the periphery of the piston, and in Figs. 2 and 3, I have shown one only.

Into either of these annular grooves suitable metallic packing rings may be sprung, such, for instance, as is shown in detail in Figs. 2 and 4, in which D, D' are two rings, each L-shape in cross section and having their inner portions $d$ projecting into the corresponding grooves in the wall of the piston, and having their faces $d'$ abut against the plane faces of the middle ring $D^2$, which middle ring is preferably rectangular in cross section. This middle ring is preferably inserted under higher tension than the two side rings D and D' so as to make a tighter joint with the inner wall of the cylinder than the two side rings referred to. It will be seen that the arrangement is such that the oil or other lubricant will be prevented, by this middle ring, from passing across the outer surface of the ring packing, and, in order to get past the inner surface of said packing, the said lubricant would have to follow a very tortuous channel and would have to get past the various joints formed by the edges of the packing rings with the corresponding parts of the piston, which joints would, under operative conditions, effectually seal the packing against the creeping of oil or other lubricant through the tortuous channel on the inside of the rings.

In the form of packing shown in Figs. 3 and 5, the outer rings E, E', which are also substantially L-shape in cross section, are provided with wedge faces $e$ which engage the wedge faces $e'$ of the middle ring $E^2$, which is substantially rectangular in cross section except it is provided with a wedging portion on its outer edge which is substantially V-shape in cross section. This middle ring $E^2$ may be sprung in under greater tension than the two outer rings, and will tend not only to force the two outer rings to press outward against the inner wall of the cylinder, but will also tend to press the outer faces $e^2$, $e^3$ of these outer rings against the corresponding wall of the packing recess in the piston, as shown most clearly in Fig. 3.

In this arrangement also, a tight joint would be formed with the inside of the cylinder between it and the piston, and the oil or other lubricant would find it very difficult to follow the tortuous passage back of the rings and to pass by the packing.

It will be obvious that various modifications might be made in the herein described device and in the construction, combination and arrangement of parts which could be used without departing from the spirit of my invention, and I do not mean to limit the invention to such details except as particularly pointed out in the claims.

Having thus described my invention, what I claim and desire to secure by Letters Patent of the United States is:

1. In a metallic piston packing, the combination with a piston provided with an annular groove in the cylindrical portion thereof, said groove having parallel side walls perpendicular to the axis of the piston, and having also a pair of annular ribs each rectangular in cross section projecting outward from the bottom of said groove, of a compound packing ring composed of two outer rings each substantially L-shaped in cross section, and a middle ring mounted between said outer rings and bearing against the adjacent faces of said outer packing rings.

2. In a metallic piston packing, the combination with a piston provided with an annular groove in the cylindrical portion thereof, said groove having parallel side walls perpendicular to the axis of the piston, and having also a pair of annular ribs each rectangular in cross section projecting outward from the bottom of said groove, of a compound packing ring composed of two outer rings each substantially L-shaped in cross section, and a middle ring mounted between said outer rings and bearing against the adjacent faces of said outer packing rings, said middle ring being inserted under higher tension than said outer rings.

HARRY MORTON BRAMBERRY.